United States Patent
Dropps et al.

(10) Patent No.: US 8,995,457 B1
(45) Date of Patent: Mar. 31, 2015

(54) SYSTEMS AND METHODS FOR MODIFYING FRAMES IN A NETWORK DEVICE

(71) Applicant: QLOGIC, Corporation, Aliso Viejo, CA (US)

(72) Inventors: Frank R. Dropps, Maple Grove, MN (US); Gary M. Papenfuss, St. Paul, MN (US); William J. Andersen, Mound, MN (US)

(73) Assignee: QLOGIC, Corporation, Aliso Viejo, CA (US)

(*) Notice: Subject to any disclaimer, the term of this patent is extended or adjusted under 35 U.S.C. 154(b) by 210 days.

(21) Appl. No.: 13/678,161

(22) Filed: Nov. 15, 2012

(51) Int. Cl.
| | |
|---|---|
| H04L 12/54 | (2013.01) |
| H04J 3/16 | (2006.01) |
| H04L 29/06 | (2006.01) |
| H04L 12/863 | (2013.01) |
| H04L 12/947 | (2013.01) |

(52) U.S. Cl.
CPC ............. H04L 69/08 (2013.01); H04L 47/50 (2013.01); H04L 12/54 (2013.01); H04L 49/252 (2013.01)
USPC ........... 370/428; 370/466; 370/468; 370/401; 370/474; 370/254; 709/230; 709/236

(58) Field of Classification Search
CPC ....... H04L 49/25; H04L 49/357; H04L 45/74; H04L 41/0893; H04L 45/60; H04L 47/6275; H04L 47/20; H04L 12/2678; H04L 47/22
USPC ......... 370/281, 342, 479, 329, 328, 360, 352, 370/392, 395, 351, 254, 241, 252, 316, 319, 370/332, 203, 320, 394, 259, 401, 412; 455/466, 427, 436, 3.02, 412.1
See application file for complete search history.

(56) References Cited

U.S. PATENT DOCUMENTS

| | | | | |
|---|---|---|---|---|
| 6,282,195 | B1 * | 8/2001 | Miller et al. ................... | 370/392 |
| 6,680,933 | B1 * | 1/2004 | Cheesman et al. ............ | 370/352 |
| 6,904,053 | B1 * | 6/2005 | Berman ......................... | 370/466 |
| 7,570,654 | B2 * | 8/2009 | Muthukrishnan et al. ..... | 370/428 |
| 7,633,971 | B1 * | 12/2009 | Butler et al. ................... | 370/474 |
| 7,826,437 | B2 * | 11/2010 | Ferguson et al. .............. | 370/342 |
| 7,924,863 | B2 * | 4/2011 | Baruch .......................... | 370/421 |
| 7,983,297 | B2 * | 7/2011 | Miller et al. ................... | 370/466 |
| 8,428,061 | B1 * | 4/2013 | Kopelman et al. ............. | 370/392 |
| 8,711,864 | B1 * | 4/2014 | Ko ............................ | 370/395.53 |
| 2002/0009081 | A1 * | 1/2002 | Sampath et al. ............... | 370/389 |
| 2002/0067733 | A1 * | 6/2002 | Stoeckl et al. ................. | 370/401 |

(Continued)

*Primary Examiner* — Candal Elpenord
(74) *Attorney, Agent, or Firm* — Klein, O'Neill & Singh, LLP (57) ABSTRACT

Methods and systems for a network device are provided. The network device includes a plurality of base-ports, where each base-port is coupled to a plurality of network links and each base-port has a plurality of sub-ports. The network device includes a transmit segment having a modifier shared by the plurality of sub-ports for modifying frames that are modified prior to being transmitted using the plurality of network links. The modifier uses a translation data structure to obtain information to modify a frame before transmission, where the translation data structure includes a plurality of entries, each entry stored in a queue that is uniquely identified by an identifier, and the identifier is extracted from a grant to transmit the frame and then used to obtain frame modification information from one of the plurality of entries. Frame modification when performed by the modifier depends on a frame type and sub-port configuration.

20 Claims, 8 Drawing Sheets

(56) References Cited

U.S. PATENT DOCUMENTS

| | | | |
|---|---|---|---|
| 2003/0016686 A1* | 1/2003 | Wynne et al. | 370/412 |
| 2003/0076780 A1* | 4/2003 | Loge et al. | 370/229 |
| 2006/0165098 A1* | 7/2006 | Varma | 370/397 |
| 2006/0190552 A1* | 8/2006 | Henze et al. | 709/216 |
| 2006/0274656 A1* | 12/2006 | Paul et al. | 370/231 |
| 2009/0207857 A1* | 8/2009 | Alexander, Jr. | 370/474 |
| 2011/0044344 A1* | 2/2011 | Hudson et al. | 370/395.53 |
| 2013/0286845 A1* | 10/2013 | Smith et al. | 370/235.1 |

* cited by examiner

| W0 Trans Function Code (241A) | TBUF Protocol (241B) | TBUF Ingress Frame (241C) | TBUF Trans Error (241D) | TBUF Ingress Frame -> Egress Frame (241E) | D_ID and S_ID Trans (241F) | D_MAC Translation (241G) | S_MAC Translation (241H) | VLAN Tag Translation/ Encap/Decap (241I) |
|---|---|---|---|---|---|---|---|---|
| 0x0 - No Translation 243A | FC | FC | No Err | FC -> FC | No | No – Set Trans Code = 00 | No | No |
| | FC | FCoE, Enet | 0x82 | — | | | | |
| | Enet | FC | 0x82 | — | | | | |
| | Enet | FCoE, Enet | No Error | FCoE -> FCoE Enet -> Enet | | | | |
| 0x1 - Translate FC 243B | FC | FC | No Error | FC -> FC | Yes | No – Set Trans Code = 00 | No | No |
| | | FCoE | 0x82 | — | — | — | — | — |
| | | Enet | 0x82 | — | — | — | — | — |
| | Enet | xx | 0x84 | — | — | — | — | — |
| | FC | xx | 0x84 | — | — | — | — | — |
| | | FC | 0x82 | — | — | — | — | — |
| 0x2 - Translate FCoE or Enet 243C | Enet | FCoE | No Error | FCoE -> FCoE | Yes | Yes-Can use Trans Codes 01, 40,41,44 | Yes | Yes |
| | | Enet | No Error | Enet -> Enet | No | Yes-Can use Trans Codes 40,44 | Yes | Yes |
| 0x3 - FC to FCoE 243D | FC | xx | 0x84 | — | — | — | — | — |
| | Enet | FC | No Error [3] | FC -> FCoE | Yes | Yes | Yes | Yes |
| | | FCoE | 0x82 | — | | | | |
| | | Enet | 0x82 | — | | | | |
| 0x4 - FCoE to FC 243E | FC | FCoE | No Error | FCoE -> FC | Yes | No | No | No |
| | | Enet | 0x82 | — | | | | |
| | Enet | xx | 0x84 | — | | | | |
| All other codes | xx | xx | 0x84 | — | — | — | — | — |

Figure 2D

| Ethernet Header 302 | FCOE Header 304 | SOF 306 | FC Header 308 | Pay Load 310 | FC CRC 312 | EOF 314 | Ethernet FCS 316 |

| | FC Header 308 ||||
|---|---|---|---|---|
| | 31      24 | 23      16 | 15      08 | 07 |
| | R_CTL | D_ID || 308A |
| | CS_CTL/Priority | S_ID || 308B |
| | Type | F_CTL |||
| | SEQ_ID | DF_CTL | SEQ_CNT ||
| | OX_ID || RX_ID ||
| | Parameter ||||

SYSTEMS AND METHODS FOR MODIFYING FRAMES IN A NETWORK DEVICE

BACKGROUND

1. Technical Field

The embodiments disclosed herein are related to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch, where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a network device is provided. The network device includes a plurality of base-ports, where each base-port is coupled to a plurality of network links and each base-port has a plurality of sub-ports configured to operate as independent ports for sending and receiving information using one of the plurality of network links at a plurality of rates complying with a plurality of protocols. The network device includes a transmit segment having a modifier shared by the plurality of sub-ports for modifying frames that are modified prior to being transmitted using the plurality of network links.

The modifier uses a translation data structure to obtain information to modify frames before transmission, where the translation data structure includes a plurality of entries, each entry stored in a queue that is uniquely identified by an identifier, and the identifier is extracted from a grant to transmit a given one of the frames and then used to obtain frame modification information from one of the plurality of entries. Frame modification when performed by the modifier depends on a frame type and sub-port configuration.

In another embodiment, a network device is provided. The network device includes a plurality of base-ports, where each base-port is coupled to a plurality of network links and each base-port has a plurality of sub-ports configured to operate as independent ports for sending and receiving information using one of the plurality of network links at a plurality of rates complying with a plurality of protocols; a transmit segment having a modifier shared by the plurality of sub-ports for modifying frames that may be modified prior to being transmitted using the plurality of network links; and a scheduler that is configured to receive requests from the plurality of sub-ports for moving frames from a receive segment and for transmitting frames from the transmit segment.

The modifier uses a translation data structure to obtain information to modify a given one of the frames before transmission, where the translation data structure includes a plurality of entries, each entry stored in a queue that is uniquely identified by an identifier, and the identifier is extracted from a grant received from the scheduler to transmit the given one of the frames and then used to obtain frame modification information from one of the plurality of entries. Frame modification when performed by the modifier depends on a frame type and sub-port configuration.

In another embodiment, a machine implemented method for performing frame translation is provided. The method includes receiving a grant from a scheduler of a network device to transmit a frame, where the network device includes a plurality of base-ports, where each base-port is coupled to a plurality of network links and each base-port has a plurality of sub-ports configured to operate as independent ports for sending and receiving information using one of the plurality of network links at a plurality of rates complying with a plurality of protocols; and using information included with a grant from a scheduler to transmit the frame for determining if any translation is needed to transmit the frame from a transmit segment.

The transmit segment includes a modifier that is shared by the plurality of sub-ports for modifying frames, and the modifier uses a translation data structure to obtain information to modify the frame before transmission, where the translation data structure includes a plurality of entries, each entry stored in a queue that is uniquely identified by an identifier, and the identifier is extracted from the grant and then used to obtain frame modification information from one of the plurality of entries. Frame modification when performed by the modifier depends on a frame type and sub-port configuration.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and non-obvious systems and methods for rate matching in networks illustrated in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component." "system" and "functionality," as used herein, generally represent software, firmware, hardware, or a combination of these elements. For instance, in the case of a software implementation, the terms "logic," "module," "component." "system," and "functionality" represent program code that performs specified tasks when executed on a processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be non-transitory, computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral. I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame includes source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

Figure 1:
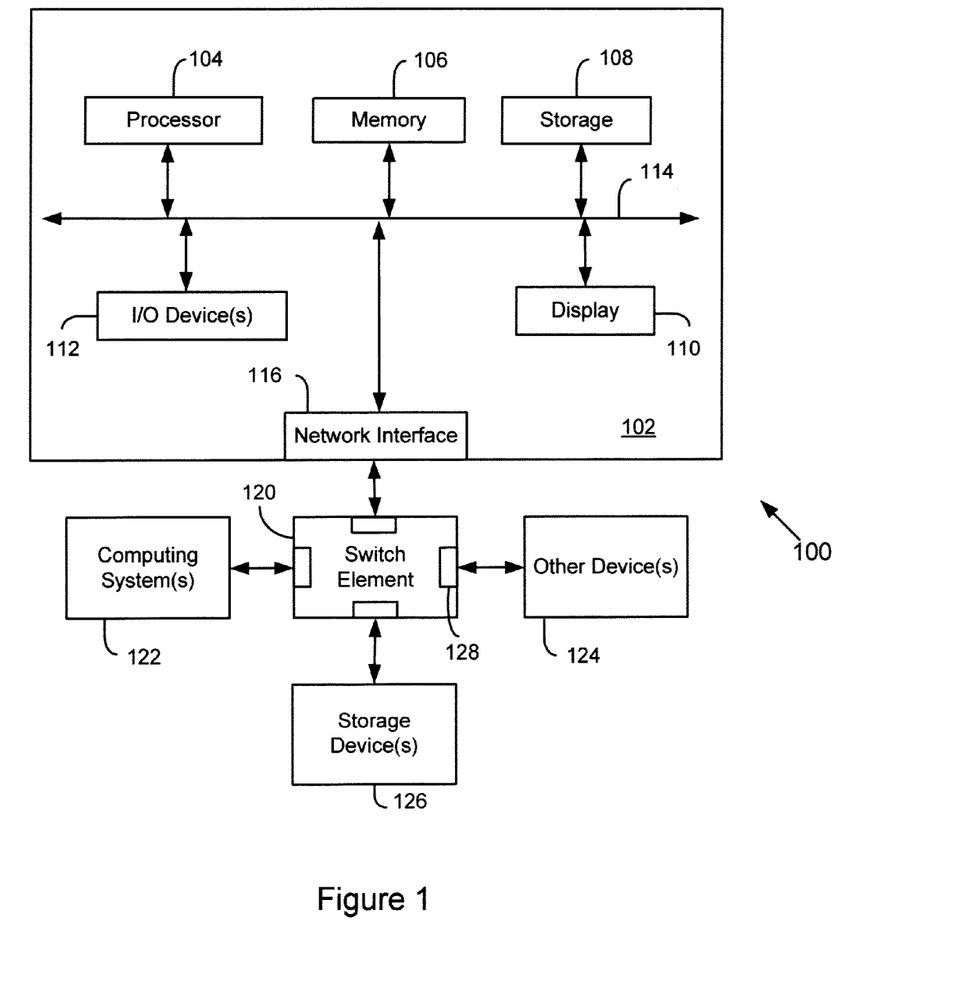

FIG. 1 illustrates an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g., the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device. e.g., network interface 116 of the host system 102 and an interface (not illustrated) for the storage devices 126. Fabric ports are typically located in Fabric devices, such as the switch element 120. Details regarding the switch 120 are provided below.

Figure 2A:
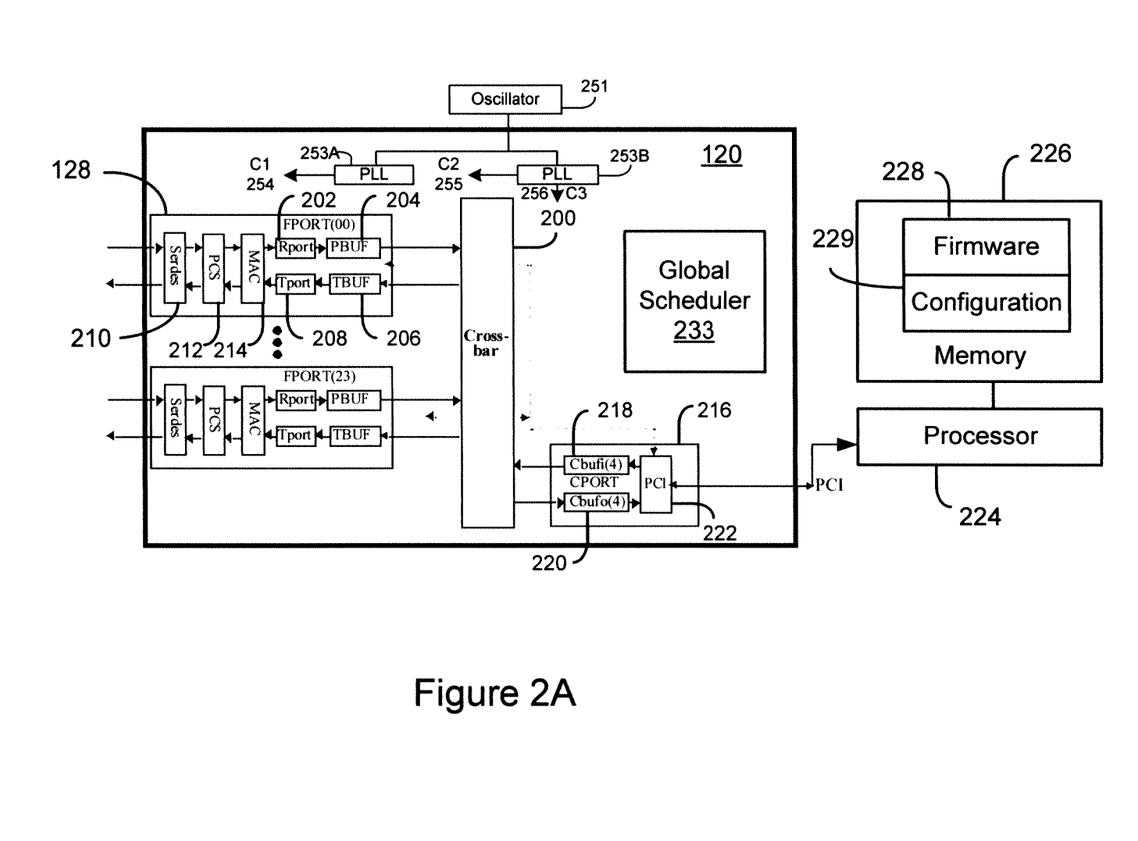
FIG. 2A is a functional block diagram of a switch element according to one embodiment.

FIG. 2A is a high-level block diagram of switch element 120, also referred to as the switch 120 having a plurality of ports 128. Switch element 120 may be implemented as an application specific integrated circuit (ASIC). An external oscillator 251 may be used to power a plurality of phase locked loop (PLL) circuits 253A-253B to generate a plurality of clocks, C1 254, C2 255 and C3 256. As an example, C1 254 may be 425 MHz when a port is configured to operate as a Fibre Channel port, C2 255 may be 312 MHz when a port is configured to operate as an Ethernet port, and C3 256 may be a system clock of 825 MHz. The embodiments disclosed herein are not limited to any particular clock rate.

Switch element 120 may have a plurality of ports 128. Ports 128 are generic (GL) ports and may include an N_Port, F_Port. FL_Port, E_Port, or any other port type. The ports 128 may be configured to operate as FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is illustrated as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed receive path for receiving frames (or information). The receive path includes a serializer/deserializer (SERDES) 210, a physical coding sub-layer (PCS) 212, and a time shared media access control (MAC) sub-layer 214. The SERDES 210 receives incoming serial data at clock C1 254 or C2 255 and converts it to parallel data. The parallel data is then sent to the PCS 212 for processing. The data is processed by PCS 212 and then read at clock C3 256. e.g., the system clock generated by PLL 253B. The data from PCS 212 is sent to MAC 214 before being sent to a receive segment (or receive port (RPORT) 202.

The RPORT 202 temporarily stores received frames at a memory storage device, illustrated as PBUF (pause buffer) 204. The frames are then sent to a transmit segment (or transmit port (TPORT)) 208 via the crossbar 200. The TPORT 208 includes a memory device illustrated as a transmit buffer (TBUF) 206. The TBUF 206 may be used to stage frames or information related to frames before being transmitted. The TPORT 208 also includes a shared MAC and PCS or may simply share PCS 212 and MAC 214 described above. The SERDES at TPORT is used to convert parallel data into an outgoing serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226 via a PCI bus or any other interconnect type. The processor 224 controls overall switch element operations, and the memory 226 may be used to store firmware instructions 228 for controlling switch element 120 operations. Memory 228 may also be used to configuration information 229 for each port 128, as well as sub-ports within port 128, described below in detail.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently operating sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
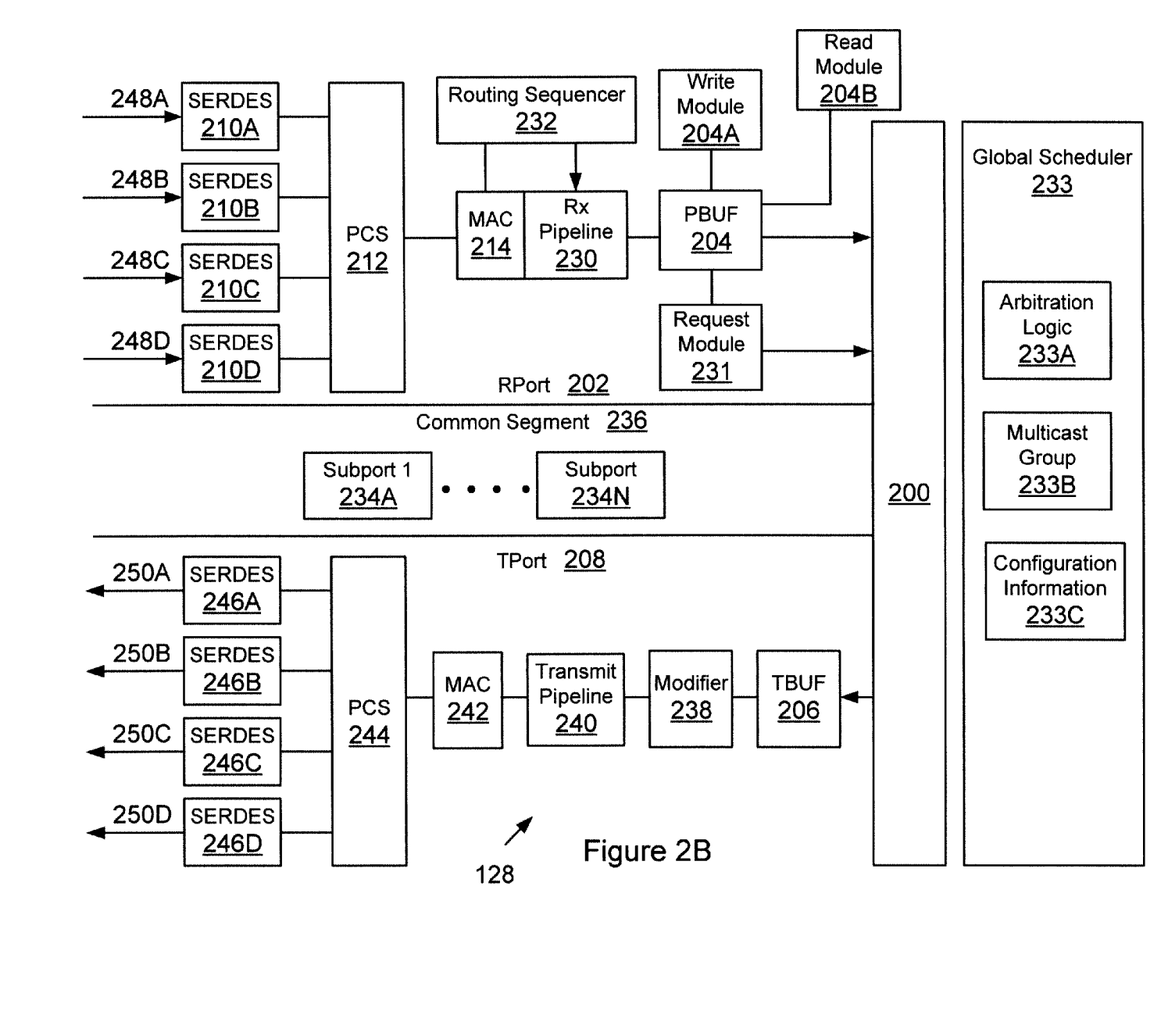
FIG. 2B is a block diagram of a base-port of a switch element, according to one embodiment.

FIG. 2B illustrates an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128.

In one embodiment, base-port may be configured to include a plurality of sub-ports. The configuration information/logic 234A-234N for each sub-port may be stored in common segment 236. The routing sequencer 232 may include routing look up tables or other data structures. In one embodiment, configuration information 234A-234N includes information regarding a protocol that a sub-port may be configured to operate at, as well as the speed at which the sub-port operates. This allows the logic/modules within the RPORT to operate and support the configured protocol/operating speed.

Port 128 may include or are connected to a plurality of network links (lanes), for example, four independent physical network links (or lanes) 248A-248D, each configured to operate as a portion of an independent sub-port within base-port 128. Each network link is coupled to a SERDES 210A-210D that share PCS 212 and MAC 214. The multiple lanes also share a receive pipeline 230 that is used for pre-processing received frames before they are transferred. Both MAC 214 and receive pipelines 230 are time multiplexed so that they can be shared among the plurality of links based on how the ports are configured to operate. In one embodiment. PCS 212 and MAC 214 are a part of receive pipeline 230.

Incoming frames for each sub-port are received via one of the network links 248A-248N. The received frame is processed by the appropriate SERDES 210A-210D for the sub-port and then sent to the PCS 212. After PCS 212 processes the frame, the frame is provided to MAC 212 that is time shared among the plurality of sub-ports. This means that for a certain time segment (for example, one or more clock cycles), MAC 214 may be used by one of the sub-ports. After the MAC 212 processes the frame it is sent to receive pipeline 230 that is also time shared. Information regarding the frame or a copy of the frame is also provided to a routing sequencer 232 that determines the destination of the received packets. In one embodiment, a frame whose destination is processor 224 is given the highest priority, followed by a frame that is routed by a TCAM or steering registers located within the routing sequencer 232, as described below in detail. More than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

Frames are written to PBUF 204 by a write module 204A that has access to sub-port configuration information stored at the common segment 236. Frames are read from PBUF 204 by a read module 204B that also has access to sub-port configuration information. The write module 204A and the read module 204B use the configuration information for managing write and read operations from PBUF 204. One reason, why the configuration information may be used to write and read from PBUF 204 is because different protocols/operating rates may have different requirements.

To move frames from the receive queues; a request module 231 generates requests for a global scheduler 233, also referred to as scheduler 233. Request module 231 maintains a data structure (not illustrated) that tracks a number of requests that may be pending for each sub-port. Request module 231 also removes requests from the data structure when a grant is received for a particular request.

Scheduler 233 stores configuration information 233C for various ports and some of that information may be used to select requests. Scheduler 233 includes arbitration logic 233A that performs dual stage arbitration for requests from various base-ports. Scheduler 233 also maintains a data structure at a memory labeled as multicast group 233B. The data structure stores information for identifying multicast groups that may receive multicast frames, e.g., frames that are destined to multiple destinations.

Frames for transmission via TPORT 208 move via TBUF 206 and a frame modifier 238. In one embodiment, frame modifier 238 may be used to insert, change or remove information from an outgoing frame. The modification is based on the frame type and transmit virtual queues (not illustrated) that are maintained at the transmit segment. The transmit segment virtual queues are associated with a physical queue and are used to hold configuration information.

The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. For clarity, separate PCS and MAC are illustrated in FIG. 2B for the receive and transmit paths. However, only a single PCS 212 and MAC 214 may be used for both receive and transmit paths.

Figure 2C:
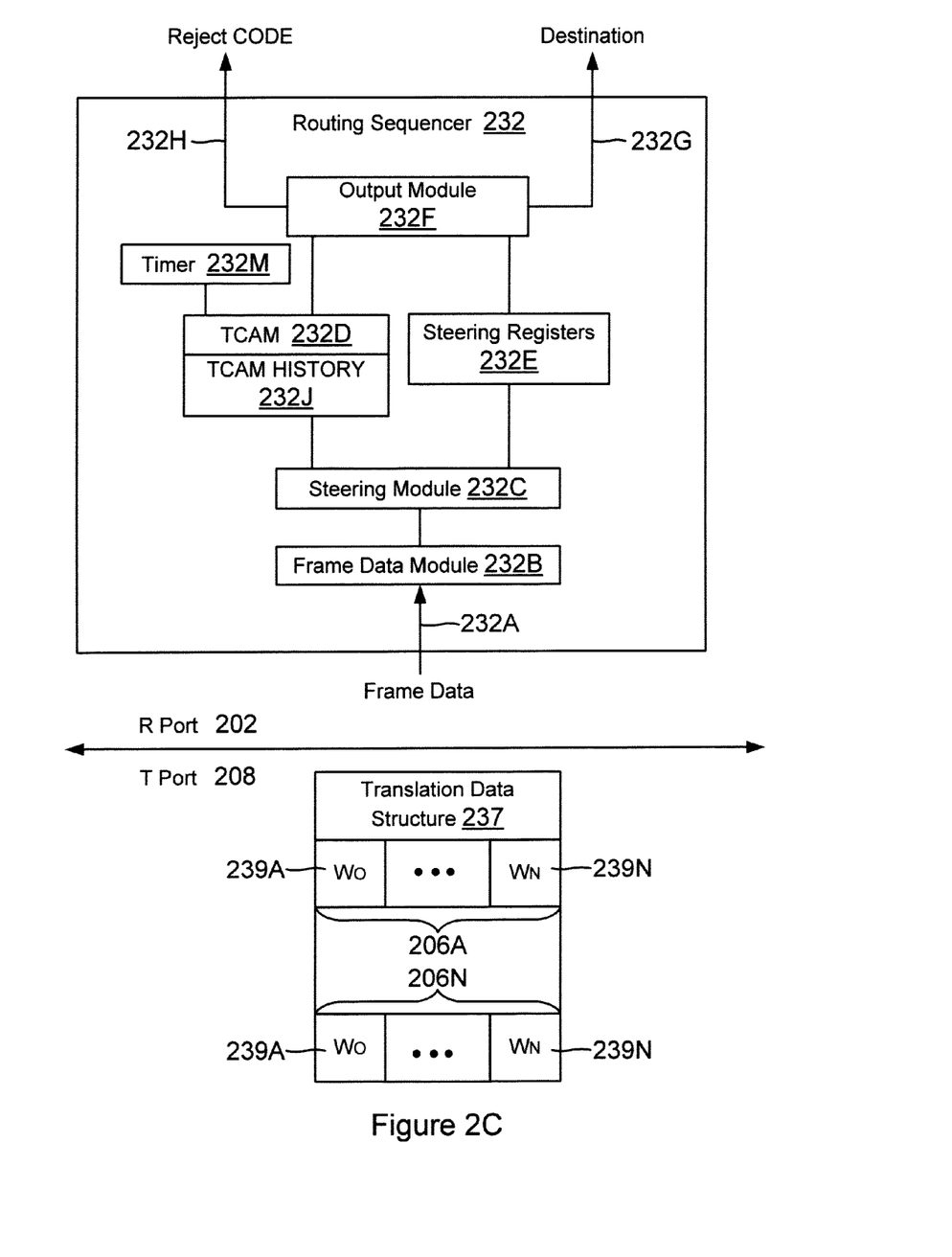
FIG. 2C is a block diagram of a routing sequencer, according to one embodiment.

FIG. 2C is a block diagram of routing sequencer 232 and translation data structure 237, according to one embodiment. The routing sequencer 232 receives frame data 232A that is staged at frame data module 232B. The frame data 232A is then used by a steering module 232C to select a destination. The destination may be selected based on certain frame fields, for example, an identifier of a frame source and/or a destination identifier. The steering module 232C may select the destination using a ternary content addressable memory (TCAM) 232D or steering register 232E, or a combination of the two. The steering registers 232E are used if there is no TCAM match and the frame is a Fibre Channel of FCoE type frame. If a match is found, then a destination 232G is provided by an output module 232F to request module 231. If there is no match and the frame type is not a Fibre Channel or FCoE, then the output module 232F generates a reject code 232H.

Unlike standard computer memory (random access memory (RAM)) in which a user supplies a memory address and the RAM returns the data word stored at that address, TCAM 232D is designed such that when a data word is supplied by steering module 232C, TCAM 232D searches its entire memory to see if that data word is stored anywhere in it. If the data word is found, TCAM 232D returns a list of one or more storage addresses where the word was found.

TCAM 232D also maintains a TCAM history module 232J to determine what TCAM entries have been matched so that old entries can be removed. TCAM history module 232J may be used to track information that may be included in received packets, for example, source MAC address, virtual local area network (VLAN) identifier information, or other packet fields. Routing sequencer 232 may also include a timer module 232M that may be used to purge TCAM history. In one embodiment, firmware is used to periodically purge the TCAM history bits in the TCAM history module 232J.

FIG. 2C also illustrates a translation data structure 237 that may be stored at TBUF 206 and accessible to modifier 238, according to one embodiment. TBUF 206 may have a plurality of queues (or locations) 206A-206N to store translation data structure entries used to modify packets before they are transmitted via links 250A-250D (FIG. 2B) as described above. Each queue has a unique identification number. The queue number is provided by the source sub-port routing sequencer 232. The queue number is also included in a request generated by the source sub-port request module 231 to move a frame received at RPORT 202.

Translation data structure 237 includes a plurality of data structures 239A-239N that are associated with each queue 206A-206N. The data structures may include a plurality of words that include information for modifier 238 to perform any modification that may be required before a frame is transmitted from the TPORT 208. The type of modification depends on the protocol and port configuration, as described below in detail. Details regarding translation data structure are provided below in detail.

Figure 2D:
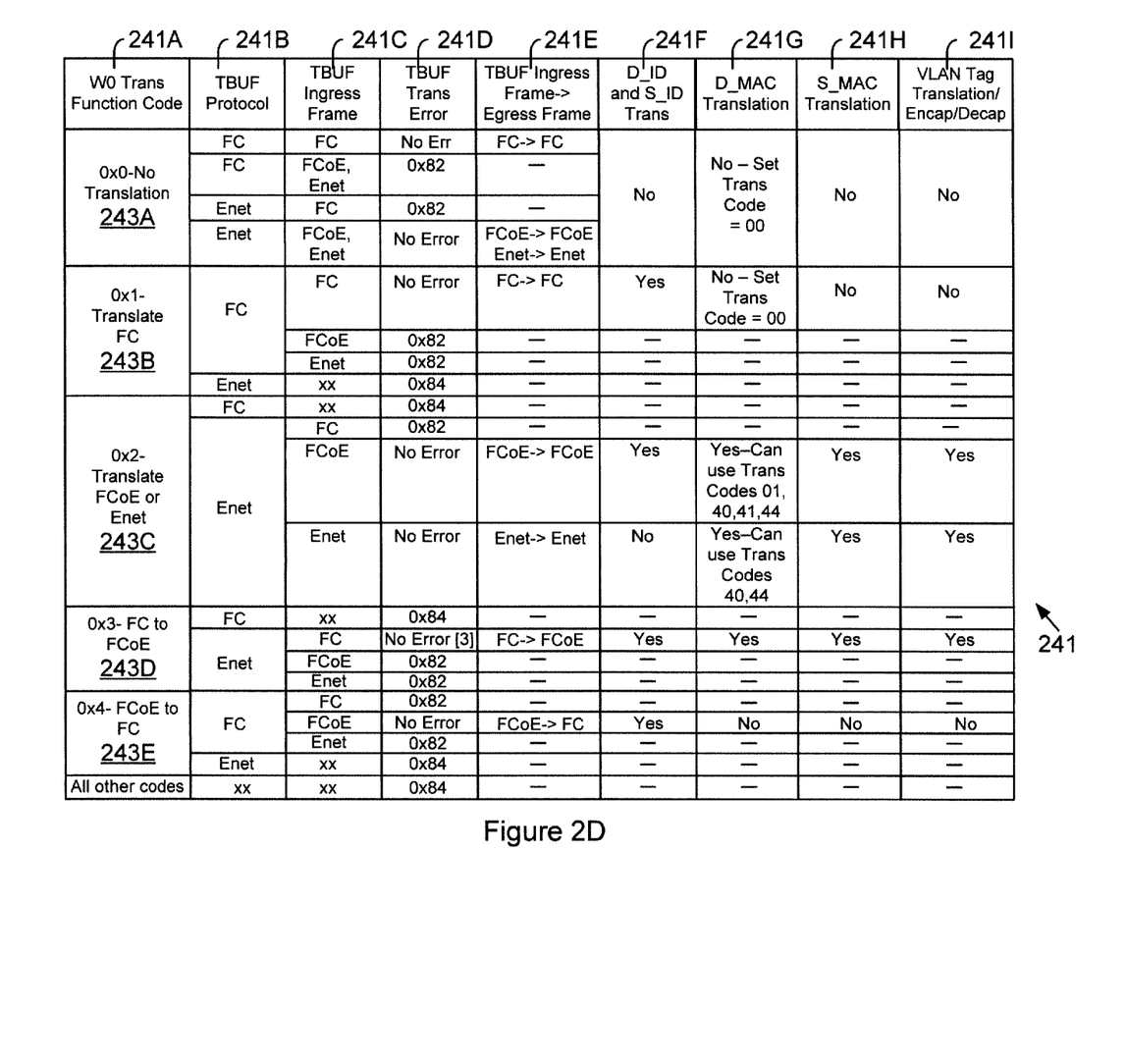
FIG. 2D is an example of a translation data structure, according to one embodiment.

FIG. 2D illustrates an example of a translation data structure (for example, illustrated as a table) 241 that a given queue 206A-206N may be configured as. These values are used to determine what sort of translation or modification, if any, may be performed on an outgoing frame. Table 241 may include a plurality of columns 241A-241I. Columns 241D-241I describe the action that is taken if the values in 241A-241C match the conditions of sub-port configuration, the type of packet in TBUF 206, and the translation data structure for the granted transmit virtual queue.

Field 241A includes a translation function code that may be a part of Word 239A (FIG. 2C). The function code may have a different value for each translation type. For example, when the translation function code has a value of 0000 that may denote no translation, a value of 0001 means only Fibre Channel translation, a value of 0010 means FCoE or Ethernet translation, a value of 0011 means adding an Ethernet header to a Fibre Channel frame, e.g., FC to FCoE translation, a value of 0100 removing an Ethernet header for FCoE to Fibre Channel mapping, or a value of 0101-1111 which means no translation and send the frame to processor 224. The various function codes are illustrated in rows 243A-243E of column 241A. The translation function code along with other translation configuration data may be loaded into a translation table by processor 224 under firmware control. Each set of table locations 239A-239N is associated with a different transmit queue.

Field 241B denotes the protocol used by the TPORT 208 to transmit the frame. Field 241C denotes the protocol of a frame that is received into TBUF 206. Field 241D shows an error code that may be generated that may result in sending a frame to processor 224. In one embodiment, some frame types are discarded when certain translation errors occur.

Field 241E shows the protocol of an entering frame and the protocol of the frame leaving the TPORT 208. This column illustrates when there is a change in protocol between the frame that was written into TBUF and the frame that was transmitted.

Field 241F shows whether a destination identifier (D_ID) and the source identifier (S_ID) using the Fibre Channel addressing scheme may be translated under the conditions detailed in columns 241A-241C. Field 241G is used to indicate if a destination MAC address may be translated under the conditions detailed in columns 241A-241C, while field 241H is to show whether a source MAC address may be translated under the conditions detailed in columns 241A-241C. Field 241I shows if a VLAN tag may be translated under the conditions detailed in columns 241A-241C, e.g., encapsulated, modified, or de-capsulated.

Rows 243A-243E show which fields in columns 241F-241I may have translation performed on them using the translation function code in column 241A. As an example, as illustrated in row 243A, when 241B and 241C are both Fibre Channel, then no translation is performed and there is no error code. No D_ID, S_ID, D_MAC, S_MAC, or VLAN translation is performed as indicated by fields 241E-241I.

When field 241B is Fibre Channel and Field 241C is FCoE or Ethernet, no translation is performed and an error code (0x82) is generated. The code indicates that the frame should be sent to processor 224. No D_ID, S_ID, D_MAC, S_MAC, or VLAN translation is performed as indicated by fields 241E-241I.

When Field 241B is Ethernet and field 241C is Fibre Channel, then no translation is performed and instead an error message (0x82) is generated. When field 241B is Ethernet and field 241C is FCoE or Ethernet, no translation is performed and no error is generated. No D_ID, S_ID, D_MAC, S_MAC, or VLAN translation is performed as indicated by fields 241E-241I.

Row 243B provides the uses of translation function code for performing Fibre Channel translation. Row 243C provides the uses of translation function code for performing Ethernet or FCoE translation. Row 243D provides uses of translation function code for translating from the Fibre Channel to FCoE protocol, while row 243E provides the uses of translation function code for translating from FCoE to Fibre Channel. The various translations in rows 243B-243E are self-explanatory. Fields 241E-241I indicate whether D_ID, S_ID, D_MAC, S_MAC, or VLAN translations may be performed or not.

Referring back to FIG. 2C, in the illustrated embodiment W0 239A includes the translation function code and information regarding D_ID Domain translation, D_ID Area and Port-ID (port identifier) translation. The translation occurs when a frame entering TBUF 206 is a Fibre Channel and the frame leaving TBUF 206 is either a Fibre Channel frame or a FCoE frame. The translation also occurs when a frame entering TBUF 206 is an FCoE frame and the frame leaving TBUF 206 is either a Fibre Channel frame or an FCoE frame. Wo 239A also specifies the values that are placed for both the Domain and Area translations. The Domain, Area and Port-ID fields are described below with respect to FIG. 3B.

W1 239B includes information regarding S_ID Domain, Area and Port-ID translations. The translation occurs when a frame entering TBUF 206 is a Fibre Channel frame and the frame leaving TBUF 206 is either a Fibre Channel frame or an FCoE frame. The translation also occurs when a frame entering TBUF 206 is an FCoE frame and the frame leaving TBUF 206 is either a Fibre Channel frame or an FCoE frame. W1 239B also specifies the values that are placed for the domain, area, and port-ID translations.

W2 239C and W3 239D include information for DMAC translation, and W4 239E and W5 239F include information for performing the SMAC translation. The Ethernet packet tag translations are specified by W6 239G and W7 239H of translation data structure 237. In one embodiment, programming allows addition of up to two tags and removal and/or modification of up to 3 tags. In the illustrated embodiment, 3 Ethernet optional tags are supported including an S-Tag, a C-Tag, and a CN-Tag. The Ether Type field values that identify the tag types may be programmable by processor 224.

Figure 3A:
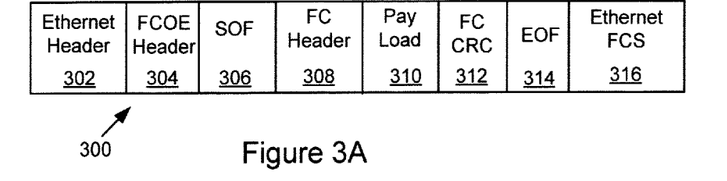
FIGS. 3A-3C illustrate different frame formats used by a switch element, according to one embodiment.

FIG. 3A illustrates an example of an FCoE packet format 300 for processing network and storage traffic, according to the present embodiments. The FCoE packet 300 includes an Ethernet header 302. In one embodiment, the Ethernet header 302 may be 14 bytes in length, for example. The FCoE packet 300 also includes an FCoE header 304 that includes the Ethernet type and version information. A start of frame (SOF) 306 indicates the beginning of a frame and may be 1 byte, for example.

The FCoE packet 300 may also include a Fibre Channel header (FC Header) 308 that may be 24 bytes long with a payload 310. The Fibre Channel cyclic redundancy code (CRC) 312 may be 4 bytes and the end of frame (EOF) 314 may be 1 byte in size. The EOF 514 indicates the end of an embedded Fibre Channel frame. The Ethernet FCS 316 is inserted after the EOF 514.

Figure 3B:
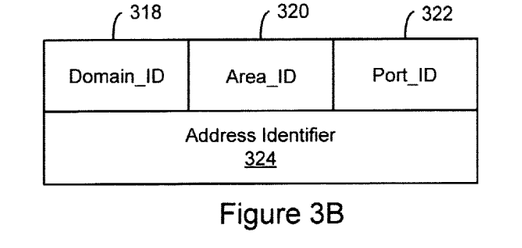

FIG. 3B illustrates a standard 24-bit Fibre Channel address identifier 324. The address identifier 324 includes a Domain_ID 318, an Area_ID 320, and a Port_ID 322. The Domain_ID 318 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 320 is an Area identifier based on the middle 8 bits of the 24-bit Fibre Channel address. The Area_ID 320 applies either to (a) one or more N_Ports within and attached to a Fibre Channel switch, or (b) to an Arbitrated Loop of NL_Ports attached to a single FL_Port.

The Port_ID 322 is the lower 8-bits of a Fibre Channel address. The Port_ID 322 applies to either (a) a single N_Port or virtualized N_Port within a Domain/Area, (b) the valid AL_PA of a single NL_Port or FL_Port on an Arbitrated Loop.

Figure 3C:
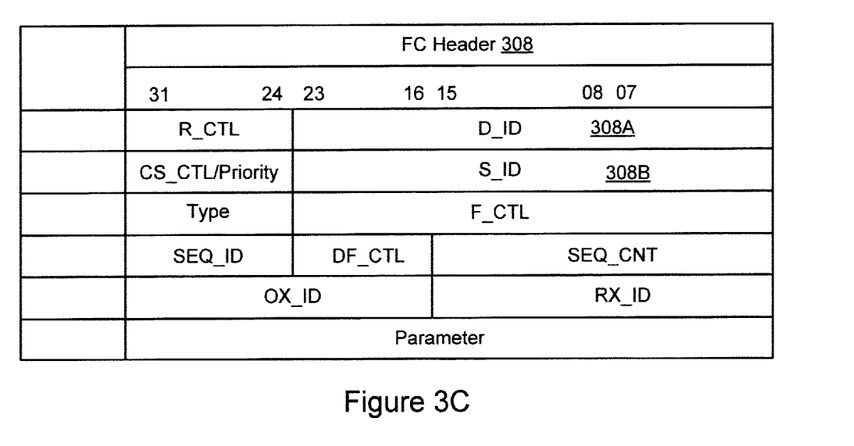

FIG. 3C illustrates an example of the FC header 308 of FIG. 3A. The following frame header fields that are used in the present methods are:

D_ID 308A—A 24-bit Fibre Channel frame header field that contains the destination address for a frame; and S_ID 308B—A 24-bit Fibre Channel frame header field that contains the source address for a frame.

Figure 4A:
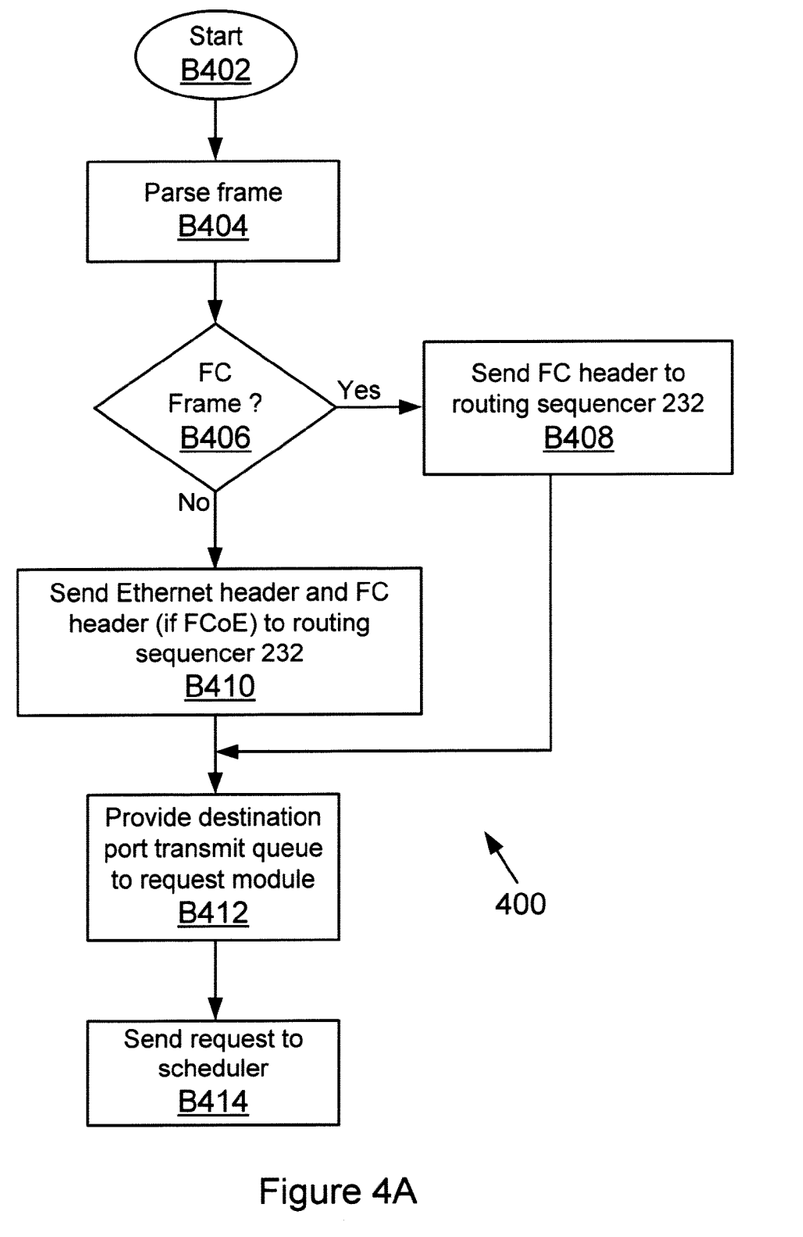
FIGS. 4A-4B are process flow diagrams, according to the present embodiments.

FIG. 4A illustrates a process 400, according to one embodiment. The process starts in block B402 when frames are received at RPORT 202 and parsed in block B404. The process then determines in block B406 if a frame is a Fibre Channel frame. If the frame is a Fibre Channel frame, then frame header information is forwarded to routing sequencer 232 at block B408 and the process moves to block B412. If the frame is not a Fibre Channel frame, then the Ethernet header and the Fibre Channel header, if the Ethernet frame is a FCoE type, are provided to routing sequencer 232 at block B410.

In block B412, the destination port queue number as maintained by TPORT 206 is provided to request module 231 that generates a request for global scheduler 233. In block B414, the request is sent to the scheduler 233.

Figure 4B:
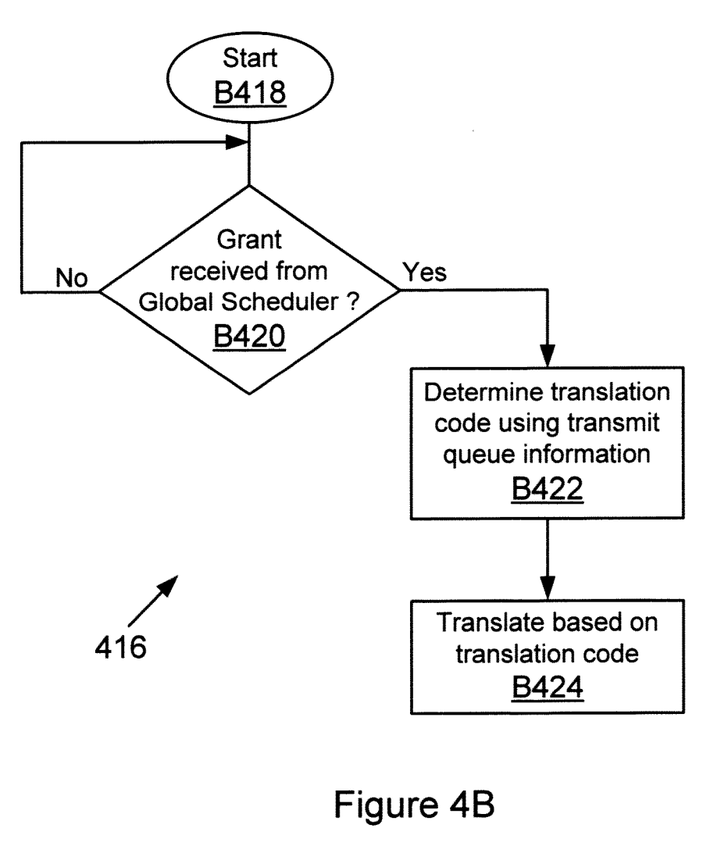

FIG. 4B illustrates a process flow diagram for handling grants received from global scheduler 233. The process begins in block B418. In block B420, the process determines if a grant is received by TBUF 206 from scheduler 233. If yes, then in block B422, the translation code associated with the queue is determined. The translation data structure, or translation configuration information as it is also referred, is stored in a memory structure in TPORT 206. This memory structure is addressed be the transmit queue number to get the translation information for each packet that is transmitted. The transmit queue number is provided by the global scheduler 233 at the same time as the TBUF grant. The transmit queue number originated from the source sub-port routing sequencer 232 at the time the frame transfer request was made to the scheduler 233. The transmit queue number is passed from the source sub-port routing sequencer 232 through the global scheduler 233 to TBUF 206. An example of the translation code is illustrated in FIG. 2D described above.

The embodiments described above provide an efficient network device that can be configured to handle multiple protocols, while using the same logic. An integrated translation data structure and a modifier can be used regardless of the protocol or link speed.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications d alternate constructions from that discussed above that are fully equivalent. For example, the embodiments described above may be implemented in any network device, including adapters, network interface cards and others. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A network device, comprising:

a plurality of base-ports, where each base-port is coupled to a plurality of network links and each base-port has a plurality of sub-ports configured to operate as independent ports for sending and receiving information using one of the plurality of network links at a plurality of rates complying with a plurality of protocols; and a transmit segment having a modifier shared by the plurality of sub-ports for modifying frames that are modified prior to being transmitted using the plurality of network links;

wherein the modifier uses a translation data structure to obtain information to modify frames before transmission, where the translation data structure includes a plurality of entries, each entry stored in a queue that is uniquely identified by an identifier, and the identifier is extracted from a grant to transmit a given one of the frames and then used to obtain frame modification information from one of the plurality of entries;

wherein frame modification when performed by the modifier depends on a frame type and sub-port configuration; and wherein frame modification is used to modify a source identifier, a destination identifier, a Media Access Control (MAC) address, and a VLAN (virtual local area network) tag.

2. The network device of claim 1, wherein the network device is a switch coupled to one or more devices.

3. The network device of claim 1, wherein one of the plurality of sub-ports is configured to operate as a Fibre Channel port.

4. The network device of claim 1, wherein one of the plurality of sub-ports is configured to operate as an Ethernet port or a Fibre Channel over Ethernet port.

5. The network device of claim 1, further comprising:
a scheduler that is configured to receive requests from the plurality of sub-ports for moving frames from a receive segment and for transmitting frames from the transmit segment, wherein the scheduler generates the grants to transmit frames from the transmit segment and provides the identifier with the grant.

6. The network device of claim 5, wherein the requests from the plurality of sub-ports are generated by a request module after a destination for received frames is determined by a routing sequencer.

7. The network device of claim 6, wherein the routing sequencer is shared by the plurality of sub-ports.

8. The network device of claim 6, wherein the routing sequencer is dedicated to one of the plurality of sub-ports.

9. A network device, comprising: a plurality of base-ports, where each base-port is coupled to a plurality of network links and each base-port has a plurality of sub-ports configured to operate as independent ports for sending and receiving information using one of the plurality of network links at a plurality of rates complying with a plurality of protocols; a transmit segment having a modifier shared by the plurality of sub-ports for modifying frames that are modified prior to being transmitted using the plurality of network links; and a scheduler that is configured to receive requests from the plurality of sub-ports for moving frames from a receive segment and for transmitting frames from the transmit segment; wherein the modifier uses a translation data structure to obtain information to modify a given one of the frames before transmission, where the translation data structure includes a plurality of entries, each entry stored in a queue that is uniquely identified by an identifier, and the identifier is extracted from a grant received from the scheduler to transmit the given one of the frames and then used to obtain frame modification information from one of the plurality of entries; wherein frame modification when performed by the modifier depends on a frame type and sub-port configuration; and wherein frame modification is used to modify a source identifier, a destination identifier, a Media Access Control (MAC) address, and a VLAN (virtual local area network) tag.

10. The network device of claim 9, wherein one of the plurality of sub-ports is configured to operate as a Fibre Channel port.

11. The network device of claim 9, wherein one of the plurality of sub-ports is configured to operate as an Ethernet port or a Fibre Channel over Ethernet port.

12. The network device of claim 9, wherein the requests from the plurality of sub-ports are generated by a request module after a destination for received frames is determined by a routing sequencer.

13. The network device of claim 12, wherein the routing sequencer is shared by the plurality of sub-ports or dedicated to one of the plurality of sub-ports.

14. The network device of claim 9, wherein the translation data structure stores a plurality of function codes that specify a modification type depending on a protocol of frames entering the transmit segment and a protocol for frames transmitted from the transmit segment.

15. The network device of claim 14, wherein the function code specifies if the modification is a Fibre Channel translation, Ethernet translation, Fibre Channel over Ethernet translation, or no modification.

16. A machine implemented method for performing frame translation, comprising:
receiving a grant from a scheduler of a network device to transmit a frame, where the network device includes a plurality of base-ports, where each base-port is coupled to a plurality of network links and each base-port has a plurality of sub-ports configured to operate as independent ports for sending and receiving information using one of the plurality of network links at a plurality of rates complying with a plurality of protocols; and using information included with a grant from a scheduler to transmit the frame for determining if any translation is needed to transmit the frame from a transmit segment;

wherein the transmit segment includes a modifier that is shared by the plurality of sub-ports for modifying frames;

wherein the modifier uses a translation data structure to obtain information to modify the frame before transmission, where the translation data structure includes a plurality of entries, each entry stored in a queue that is uniquely identified by an identifier; and the identifier is extracted from the grant and then used to obtain frame modification information from one of the plurality of entries, and frame modification when performed by the modifier depends on a frame type and sub-port configuration; and wherein frame modification is used to modify a source identifier, a destination identifier, a Media Access Control (MAC) address, and a VLAN (virtual local area network) tag.

17. The method of claim 16, wherein the translation data structure stores a plurality of function codes that specify a modification type depending on a protocol of frames entering the transmit segment and a protocol for frames transmitted from the transmit segment.

18. The method of claim 17, wherein the function code specifies if the modification is a Fibre Channel translation, Ethernet translation, Fibre Channel over Ethernet translation, or no modification.

19. The method of claim 16, wherein the scheduler is configured to receive requests from the plurality of sub-ports for moving frames from a receive segment and for transmitting frames from the transmit segment.

20. The method of claim 16, wherein one of the plurality of sub-ports is configured to operate as a Fibre Channel port and one of the plurality of sub-ports is configured to operate as an Ethernet port or a Fibre Channel over Ethernet port.

* * * * *

UNITED STATES PATENT AND TRADEMARK OFFICE
CERTIFICATE OF CORRECTION

PATENT NO. : 8,995,457 B1
APPLICATION NO. : 13/678161
DATED : March 31, 2015
INVENTOR(S) : Dropps et al.

Page 1 of 1

It is certified that error appears in the above-identified patent and that said Letters Patent is hereby corrected as shown below:

In the specification

Column 3, line 16, delete "component." and insert -- component, --, therefor.

Column 3, line 20, delete "component." and insert -- component, --, therefor.

Column 4, line 9, delete "peripheral." and insert -- peripheral, --, therefor.

Column 6, line 10, delete "F_Port." and insert -- F_Port, --, therefor.

Column 7, line 55, delete "embodiment." and insert -- embodiment, --, therefor.

Signed and Sealed this
Twenty-ninth Day of December, 2015

Michelle K. Lee
*Director of the United States Patent and Trademark Office*